Aug. 18, 1959  M. STEINER  2,899,709
PROCESS OF MAKING BLOWN HOLLOW BODIES FROM PLASTIC MATERIALS
Filed Oct. 12, 1954

Inventor:
Maurice Steiner
by:
Michael S. Striker
Attorney

United States Patent Office 2,899,709
Patented Aug. 18, 1959

2,899,709

PROCESS OF MAKING BLOWN HOLLOW BODIES FROM PLASTIC MATERIALS

Maurice Steiner, Paris, France, assignor, by mesne assignments, to Societe Plastus S.A., Fribourg, Switzerland, a corporation of Switzerland Application October 12, 1954, Serial No. 461,833

4 Claims. (Cl. 18—55)

This invention relates to a process of making blown hollow bodies from plastic materials.

In the known processes of manufacturing a hollow body from plastic material by simultaneous extrusion and blowing, in which a tube into which air is blown is formed by extrusion, and continuously, the plastic material comes out of the extruder, passing through a die or nozzle delimitated by the inside walls of the outlet orifice of the extruder and the outside surface of the air-blowing plunger or tube which passes through the neck of the hollow body originally formed. The result is that from the very beginning of the process of forming the hollow body, the bottom of the latter must be closed and blowing takes place inside a cavity, the inside wall of which is entirely constituted by plastic material, with the exception, of course, of the walls of the air-blowing tube inside the said cavity. In these processes, it is necessarily the bottom which is closed first and blowing takes place by the arrival of air through the injection or extrusion nozzle.

This method of operation has drawbacks, in particular those of not enabling hollow bodies with necks—of the bottle type for instance—to be made, in which there may be any ratio whatsoever between the thicknesses of the said neck and the walls, of not ensuring the bottom of said body to be held immovably since it is only applied against the mould by the pressure of the blowing air, or furthermore of necessitating complicated mechanical devices.

The present invention is directed to remedying these drawbacks and, for this purpose, one of its objects is a process of making hollow bodies from plastic materials of the type indicated. This process is characterized in particular by the fact that the open end of a tubular element of plastic material is seized and held on coming out of an extrusion or injection nozzle and a hollow body is then formed by relative displacement of this extremity and the said nozzle and simultaneous blowing, if necessary inside a mould.

It is thus seen that blowing takes place inside a cavity of which the inside wall is only partially formed of plastic material, final closure of this cavity being brought about only after a certain period of blowing, by simply pinching the material or by means of a special mechanical device.

For bottles or flagons, it is the narrowed part, or neck, which is formed first and held immovably.

Blowing can be carried out equally well in the direction opposite the direction of flow of the extruded material as in the same direction, that is to say through an orifice provided in the injection nozzle.

The extremity of the tubular element can be held in place by any desired means. It can be done by formation and squeezing of a narrowed part, or neck, between the inside wall of a mould, which can be tapped if required, and the outside wall of a part, cylindrical for instance, used for blowing.

It can also be effected by blocking or squeezing the said extremity of a plug, which can be tapered for instance, or again by pinching or squeezing it between parts which are brought into contact, space being left if required for a blowing channel through these parts.

As has already been stated, the hollow body can be finally closed merely by pinching or squeezing the plastic material directly on the level of the open body of the mould, or, alternatively a little beyond it, and the squeezed part can then be brought back towards the said bottom so as to bring about the formation of reinforced parts in the area of junction between the bottom and the lateral wall of the hollow body, thanks to an excess quantity of plastic material.

In an alternative form of process under the invention, the hollow body is closed by forming a roll of plastic material on the bottom, closing the extrusion orifice, and flattening the said roll by blowing.

A further object of the invention is a device intended for applying the process explained above. This device is characterized more particularly by the fact that it comprises a mould of which the inside wall corresponds to the shape of the lateral surface of the hollow body to be made, an air-blowing tube coaxial with the mould and penetrating into the latter by the upper part corresponding to the neck of the hollow body to be made, and, opposite the said blowing tube, an annular nozzle for injecting the plastic material, with variable orifice, also coaxial with the said mould and movable along its axis.

In one particular form of embodiment of the said nozzle, the latter is constituted by a cylindrical outside tube, the upper edge of which is preferably annular and flat, and an inside plunger, co-axial with the said tube and movable in relation to it.

Such a device enables the process already described to be carried out easily by suitably regulating the quantity of material injected, which is dependent on the injection pressure and temperature, and the downward speed of the nozzle upon which the thickness of the walls of the body to be made depends.

Above all, this device permits of treating plastic materials with a narrow zone of plasticity by carrying out blowing in such a way that the lateral wall is quickly formed by application of the layer of plastic material on the inside surface of the mould, which may be at any temperature, and so that only the plate forming bottom has to be maintained at the desired temperature of plasticity. In this case the speed of removing the article from the mould is also considerably increased, owing to the fact that it is not essential to bring the mould to the plasticity temperature and that the plastic solidifies during the course of blowing.

The device according to the invention, not only permits of operating according to the above described process, that is to say of blowing inside the body before its closure at substantially constant pressure, but also of bringing about closure at any desired time, particularly before the end of blowing, which can thus be carried on progressively.

Without this being in any way restrictive, specimens of devices for the manufacture of a bottle of plastic material according to the invention have been shown in the accompanying drawing in which.

Figure 1:
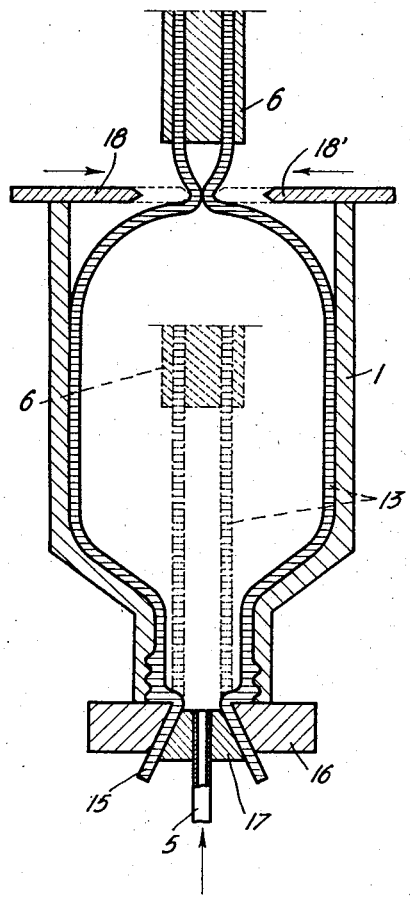
Fig. 1 is a diagrammatc view of an axial section of the device according to the invention showing the second mold into which the open end of the tubular element is extruded for anchoring the same.

In the specimen embodiment shown in Fig. 1, the device is fitted, at the bottom part of the mould 1, with an anchoring means for holding the anchoring part or extension 15 of the tubular element 13 coming out of the annular extrusion nozzle 6. This anchoring means comprises a plate 16 formed with an orifice in the form of a truncated cone which can be closed by a plug 17. The air-blowing channel 5 passes through this plug 17. At the upper part of the mould 1, two knives 18, 18' pinch the tube 13 of plastic material thus ensuring final closure of the bottom of the hollow body.

It will be seen that, with this device, the tubular part 13 extruded through the extrusion nozzle 6, is first squeezed and therefore held in place by its anchoring part 15, between the plate 16 and the plug 17, and then air is blown in through the channel 5 simultaneously with the displacement of the nozzle 6, in relation to the mould 1, and therefore to the feed of plastic material. At the end of the operation, the bottom is closed by bringing the two knives 18, 18' together.

Blowing can still be continued until the layer 13 is perfectly applied to the walls of the mould.

Figure 2:
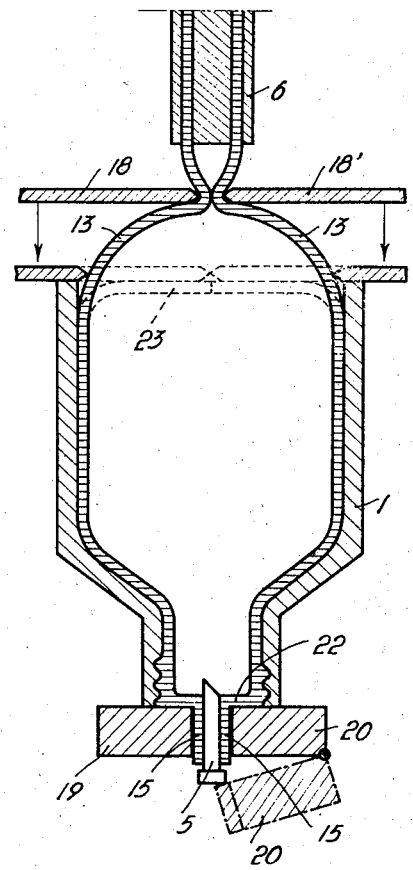
Fig. 2 illustrates a modification of the anchoring arrangement.

In the specimen embodiment shown in Fig. 2, the anchoring part 15 of the tubular part 13 is immobilized by being squeezed between a fixed plate 19 and an articulated plate 20, space being allowed between the two plates for the passage of the air-blowing channel 5 which passes through the film 22 of plastic material.

The hollow body is formed as has just been described with reference to Fig. 1. However, the knives 18, 18' which ensure final closure of the bottom are movable in relation to the upper part of the mould and are originally placed at a certain distance from this upper part. After closure by squeezing between these knives 18, 18', the latter are moved back towards the orifice of the mould (position shown by broken lines of Fig. 2) and the bottom of the hollow body is formed with an excess of plastic material at the zone of junction 23 with the lateral walls of the said body.

As can be seen, the various devices described therefore enable the process covered by the invention to be carried out in its various forms. The mould can be in one piece since the body made can be removed if necessary after unscrewing its neck. The respective thicknesses of the neck, the walls and the bottom of the bodies manufactured can moreover be regulated precisely and be independent of each other.

It goes without saying that the invention is in no way limited to the details of embodiment shown or described which have merely been given by way of illustration. Thus, in particular, the air-blowing tube could be mobile, or its outside surface could be of any shape corresponding to the inside wall of the neck of the bottle to be made, for instance tapered or threaded; the bottom of the injection nozzle plunger could be of any desired shape, for instance convex, and lettering could be engraved thereon; the plug 17 shown in Fig. 4 could be cylindrical; the mould 1 could be replaced by any receptacle or tube intended to be given an inside jacket of plastic material.

What I claim is:

1. In a process of forming hollow articles of plastic material which comprises extruding through an extruding nozzle inside a mold body a tubular element of said plastic material having an open end and simultaneously expanding said tubular element by blowing gas into said element through a blowing nozzle through said open end of said tubular element, moving away from one another said extruding nozzle and said blowing nozzle, and closing the end of said article opposite to said open end of said tubular element, the steps of extruding said open end of said tubular element at the beginning of the extrusion process into another mold surrounding said nozzle forming an anchoring extension of said open end of said tubular element; forming the whole of the hollow article by simultaneous extrusion, blowing and relative displacement of said extruding and blowing nozzles while said anchored extension of said tube holds said article during its molding against displacement by gas blown into said tubular element; and removing said anchoring extension from said hollow article.

2. The process as in claim 1, wherein said open end of said tubular element is extended into an annular passage in said other mold surrounding said blowing nozzle.

3. The process as in claim 2, including the step of reducing the width of the annular passage for gripping said anchoring extension.

4. In a method of extruding hollow articles of plastic material, the steps of placing an extrusion nozzle in a mold having at one end an anchoring means; extruding the plastic material through said nozzle into said anchoring means to form an anchoring part held by said anchoring means; moving away from each other said nozzle and said anchoring means until said nozzle passes out of the other end of said mold while extruding the plastic material in the form of a tubular element into said mold; blowing a gas into said tubular element at least during extrusion of the same to expand the same until it abuts on the inner surface of said mold while being held in place by said anchoring part; closing the extruded tubular element at the other end of said mold; and severing said anchoring part.

References Cited in the file of this patent
UNITED STATES PATENTS

| 2,288,454 | Hobson | June 30, 1942 |

FOREIGN PATENTS

| 495,105 | Belgium | Apr. 29, 1950 |
| 1,029,586 | France | June 3, 1953 |